(12) United States Patent
Shahipassand et al.

(10) Patent No.: US 11,168,521 B2
(45) Date of Patent: Nov. 9, 2021

(54) HARMONIC GEAR DRIVE

(71) Applicant: NABORS LUX 2 SARL, Luxembourg (LU)

(72) Inventors: Siamak Shahipassand, Stavanger (NO); Andrew Gorrara, Ågård (NO); Ola Stengel, Sandnes (NO)

(73) Assignee: NABORS LUX 2 SARL, Luxembourg (LU)

( * ) Notice: Subject to any disclaimer, the term of this patent is extended or adjusted under 35 U.S.C. 154(b) by 0 days.

(21) Appl. No.: 16/383,282

(22) Filed: Apr. 12, 2019

(65) Prior Publication Data

US 2019/0234503 A1 Aug. 1, 2019

Related U.S. Application Data

(62) Division of application No. 15/131,356, filed on Apr. 18, 2016, now abandoned.

(60) Provisional application No. 62/150,101, filed on Apr. 20, 2015.

(51) Int. Cl.
*E21B 4/00* (2006.01)
*F16H 49/00* (2006.01)

(52) U.S. Cl.
CPC .......... *E21B 4/006* (2013.01); *F16H 49/001* (2013.01); *F16H 2049/003* (2013.01)

(58) Field of Classification Search
CPC .. F16H 49/001; F16H 2049/003; E21B 4/006; B25J 9/1025
USPC .................................................. 74/640, 411
See application file for complete search history.

(56) References Cited

U.S. PATENT DOCUMENTS

| | | | | | |
|---|---|---|---|---|---|
| 4,545,263 | A | * | 10/1985 | Fickelscher | F16H 49/001 192/18 A |
| 4,601,216 | A | * | 7/1986 | Inoue | F16H 49/001 74/640 |
| 6,059,661 | A | * | 5/2000 | Simpson | E21B 7/067 464/19 |
| 9,435,418 | B2 | * | 9/2016 | Hoshina | F16C 19/44 |
| 9,822,864 | B2 | * | 11/2017 | Oishi | F16H 49/001 |
| 2013/0333505 | A1 | * | 12/2013 | Yeh | F16H 49/001 74/412 R |
| 2014/0086698 | A1 | * | 3/2014 | Huddleston | H02G 1/06 408/226 |
| 2015/0049975 | A1 | * | 2/2015 | Lee | F16C 33/58 384/569 |

(Continued)

OTHER PUBLICATIONS

Wikipedia contributors. (Sep. 13, 2014). Rotary steerable system. In Wikipedia, The Free Encyclopedia. Retrieved 20:22, May 19, 2021, from https://en.wikipedia.org/w/index.php?title=Rotary_steerable_system&oldid=625447276 (Year: 2014).*

*Primary Examiner* — Joseph Brown
(74) *Attorney, Agent, or Firm* — Locklar PLLC

(57) ABSTRACT

A harmonic gear drive includes an input shaft and an output shaft. The input shaft is mechanically coupled to a wave generator which has a varying diameter. The wave generator is positioned within a flex spline which includes external teeth. The external teeth of the flex spline engage with internal teeth of a fixed spline and an output spline when the major diameter of the wave generator is aligned therewith. The output spline has a different number of teeth from the input spline such that, as the wave generator is rotated and the flex spline rotates, the output spline is rotated relative to the fixed spline.

12 Claims, 4 Drawing Sheets

(56) References Cited

U.S. PATENT DOCUMENTS

| | | | |
|---|---|---|---|
| 2015/0271085 A1* | 9/2015 | Nakajima | H04L 45/14 |
| | | | 370/465 |
| 2015/0376948 A1* | 12/2015 | Snyder | E21B 4/02 |
| | | | 175/57 |
| 2016/0084006 A1* | 3/2016 | Marland | E21B 7/00 |
| | | | 175/40 |
| 2016/0222734 A1* | 8/2016 | Winslow | E21B 7/062 |
| 2016/0305528 A1* | 10/2016 | Shahipassand | F16H 49/001 |
| 2017/0219050 A1* | 8/2017 | Handa | F16H 49/001 |

\* cited by examiner

HARMONIC GEAR DRIVE

CROSS-REFERENCE TO RELATED APPLICATIONS

This application is a divisional application which claims priority from U.S. utility application Ser. No. 15/131,356, filed Apr. 18, 2016, which is itself a nonprovisional application which claims priority from U.S. provisional application No. 62/150,101, filed Apr. 20, 2015, the entirety of which is hereby incorporated by reference in its entirety.

TECHNICAL FIELD/FIELD OF THE DISCLOSURE

The present disclosure relates generally to power transmission mechanisms and specifically to power transmission mechanisms in downhole tools.

BACKGROUND OF THE DISCLOSURE

In a wellbore, rotation of components relative to the rest of the drill string may be desired. Typically, rotation downhole is generated by a motor such as an electric motor or mud motor. However, the rotation rate of electric motors and mud motors may be too rapid for the desired rotation. When a relatively slow rotation relative to the rest of the drill string is desired, one or more transmission devices may be required.

SUMMARY

The present disclosure provides for a harmonic gear drive. The harmonic gear drive may include an input shaft. The input shaft may be generally tubular. The harmonic gear drive may include a wave generator mechanically coupled to the input shaft. The wave generator may have a varying diameter. The portion of the wave generator having the largest diameter may define a major diameter of the wave generator. The harmonic gear drive may include a flex spline. The flex spline may be generally tubular and may include external teeth. The flex spline may be adapted to be positioned about the wave generator and to be elastically flexed thereby as the wave generator is rotated. The harmonic gear drive may include a fixed spline. The fixed spline being annular in shape and including a first number of internal teeth adapted to engage the external teeth of the flex spline aligned with the major diameter of the wave generator. The harmonic gear drive may include an output spline, the output spline being annular in shape and including a second number of internal teeth adapted to engage the external teeth of the flex spline aligned with the major diameter of the wave generator. The second number of internal teeth may be different from the first number of internal teeth.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
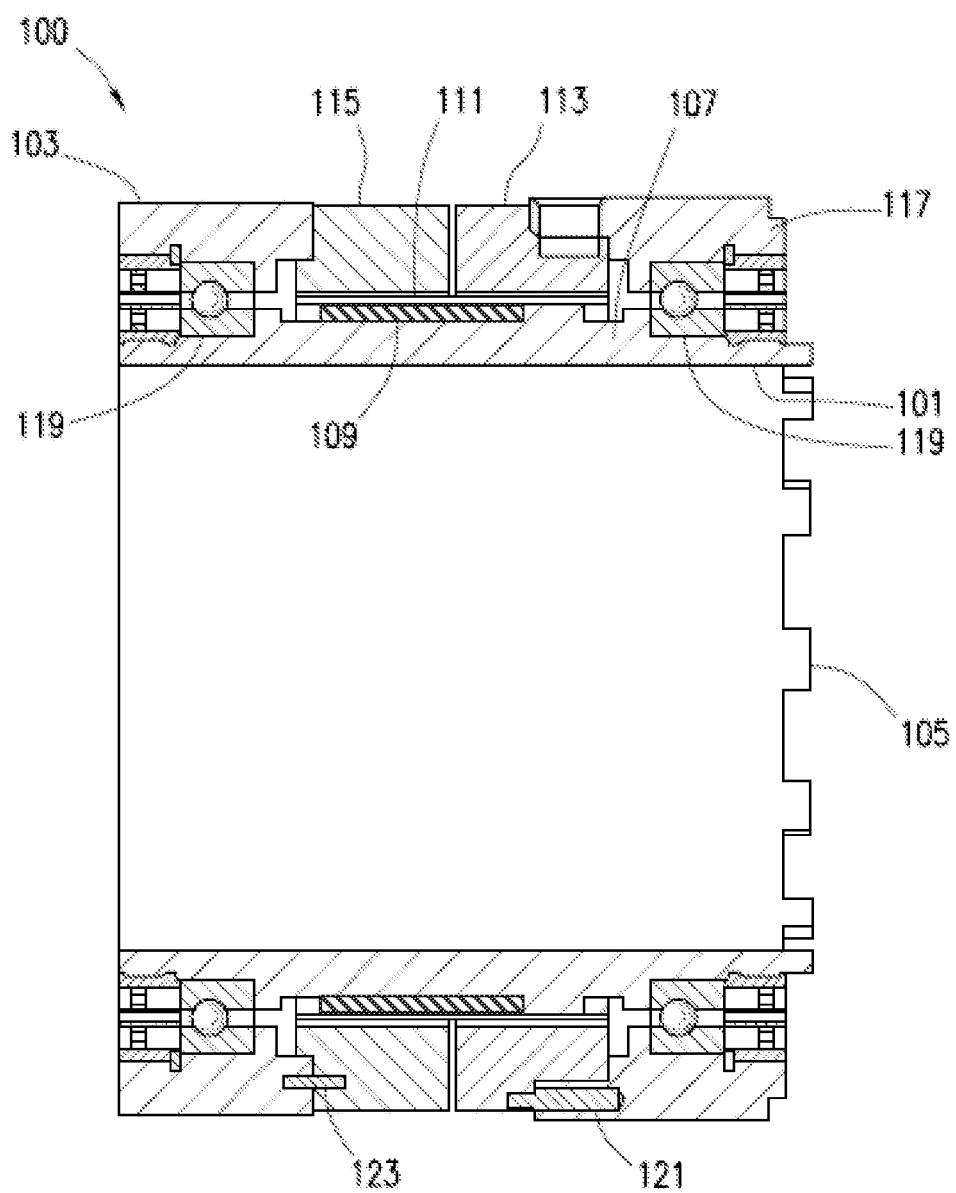
FIG. 1 depicts a cross section view of a harmonic gear drive consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Figure 2:
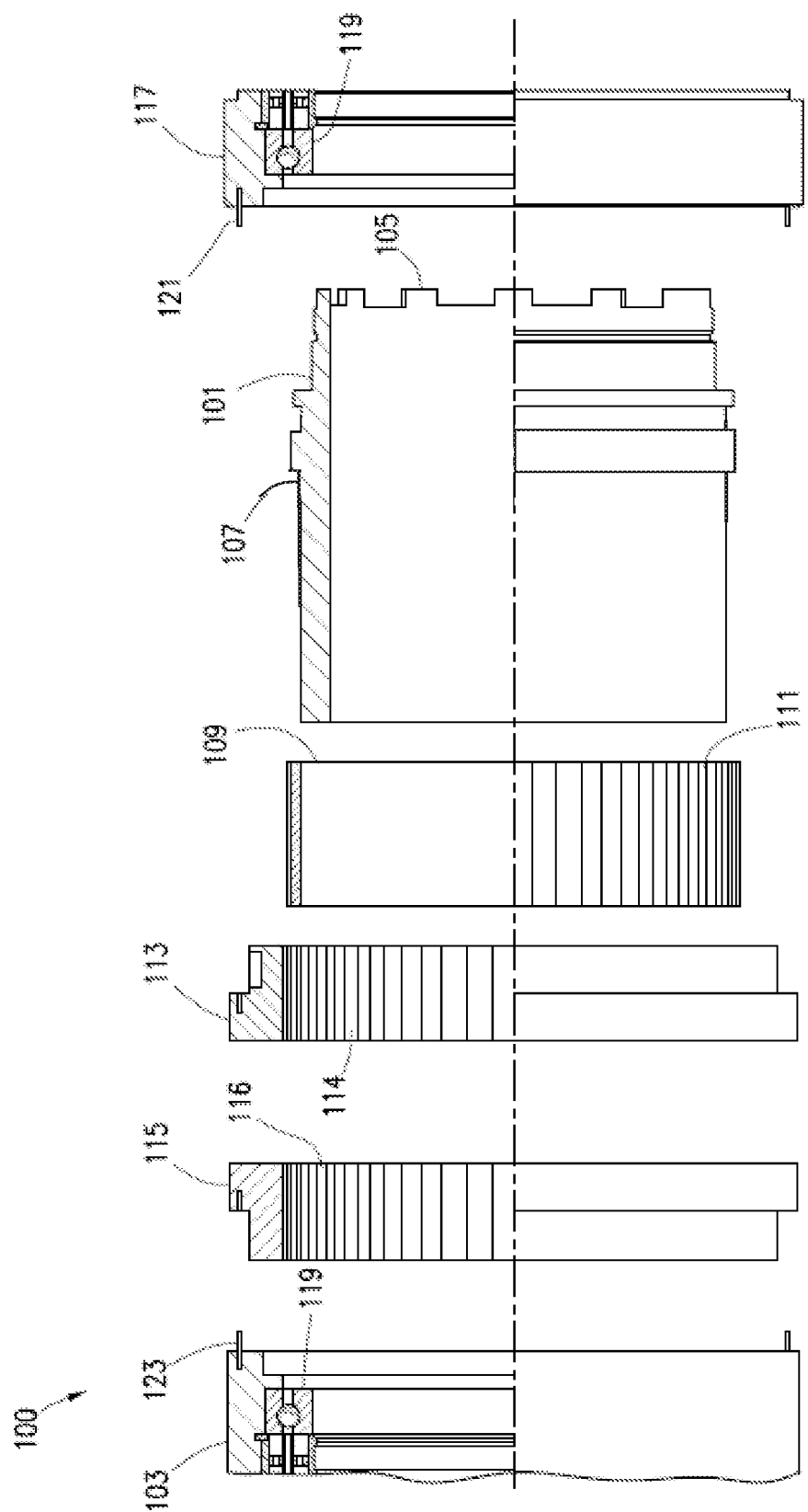
FIG. 2 depicts an exploded partial cross section view of the harmonic gear drive of FIG. 1.

As depicted in FIGS. 1, 2, harmonic gear drive 100 may mechanically couple between input shaft 101 and output sub 103. Input shaft 101 may be mechanically coupled to the output shaft of a motor (not shown). The motor may, for example and without limitation, be a mud motor, electric motor, or any other motor suitable for use in a wellbore. In some embodiments, input shaft 101 may be mechanically coupled directly to an output shaft of the motor. In some embodiments, input shaft 101 may include one or more power transmission couplings that mechanically couple input shaft 101 to the output shaft of the motor. For example and without limitation, in some embodiments, the transmission coupling may include castellations 105 as depicted in FIGS. 1, 2. Castellations 105 may be formed in input shaft 101 and may link with castellations formed in the output shaft of the motor to allow rotational forces to be transmitted into input shaft 101 by interlocking the castellations 105.

Figure 3:
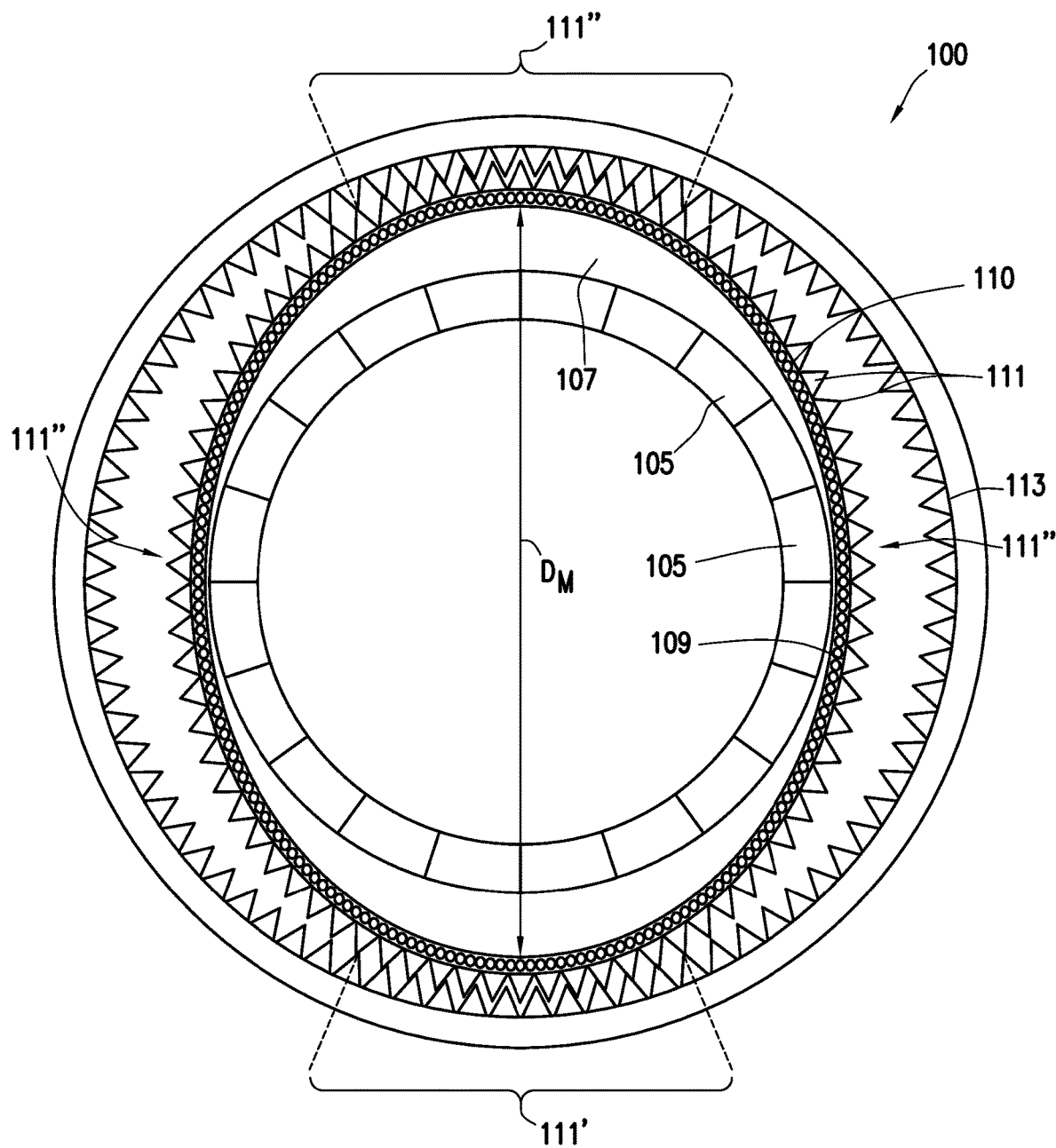
FIG. 3 depicts a partially disassembled end view of the harmonic gear drive of FIG. 1.

Input shaft 101 may be mechanically coupled to wave generator 107. In some embodiments, input shaft 101 and wave generator 107 may be generally tubular, allowing a central bore to be formed therethrough. In some embodiments in which harmonic gear drive 100 is used as part of a downhole tool, the central bore may allow, for example and without limitation, the circulation of drilling fluid therethrough. Wave generator 107 may be formed as an integral part of input shaft 101. In some embodiments, wave generator 107 may constitute an eccentric cam having a varying diameter. For example, as depicted in FIG. 3, wave generator 107 may be generally elliptical in cross section. As used herein, "major diameter" of wave generator 107 describes the portion or portions of wave generator 107 having the largest diameter, depicted in FIG. 3 as $D_M$. One having ordinary skill in the art with the benefit of this disclosure will understand that depending on the cross-sectional shape of wave generator 107, one or more major diameters $D_M$ may be formed. "Diameter" as used with respect to a point along the outer perimeter of wave generator 107 means a line measured from the point through the center to a point on the perimeter of wave generator 107 opposite the point.

As depicted in FIGS. 1, 2, wave generator 107 may be positioned within flex spline 109. Flex spline 109 may be a generally tubular member having external teeth 111. In some embodiments, flex spline 109 may engage with fixed spline 113 and output spline 115. Fixed spline 113 and output spline 115 may be annular bodies. Fixed spline 113 may be mechanically coupled to fixed sub 117 such that it does not rotate relative to fixed sub 117. Fixed spline 113 may include internal teeth 114 adapted to engage external teeth 111 of flex spline 109. Output spline 115 may be rigidly mechanically coupled to output sub 103. Output spline 115 may include internal teeth 116 adapted to engage external teeth 111 of flex spline 109.

In some embodiments, flex spline 109 may elastically deform in response to the rotation of wave generator 107. In some embodiments, external teeth 111 of flex spline 109 may engage internal teeth 114 of fixed spline 113 and internal teeth 116 output spline 115 where flex spline 109 is aligned with major diameter $D_M$ of wave generator 107. As depicted in FIG. 3, external teeth 111' are engaged with internal teeth 114 of fixed spline 113, whereas external teeth 111" are not. Wave generator 107 may slide within flex spline 109 as wave generator 107 is rotated. In some embodiments, needle bearing 110 may be positioned between wave generator 107 and flex spline 109. Needle bearing 110 may include a plurality of rollers or needles positioned between the surfaces of flex spline 109 and wave generator 107 and to rotate between flex spline 109 and wave generator 107. Needle bearing 110 may, for example and without limitation, reduce friction between wave generator 107 and flex spline 109 as flex spline rotates around wave generator 107. As understood in the art, needle bearing 110 may, in some embodiments, include additional components such as races (not shown) without deviating from the scope of this disclosure. As understood in the art, the teeth of fixed spline 113 engaged with external teeth 111 of flex spline 109 may thus precess about internal teeth 114 of fixed spline 113 as wave generator 107 is rotated.

As the engaged external teeth 111' precess, flex spline 109 rotates relative to fixed spline 113 based on the difference in number of teeth between flex spline 109 and fixed spline 113.

As described above with respect to fixed spline 113, external teeth 111' (aligned with major diameter $D_M$ of wave generator 107) are likewise engaged with internal teeth 116 of output spline 115. In some embodiments, output spline 115 may have a different number of teeth than fixed spline 113. In some embodiments, output spline 115 may have between 1 and 10 fewer teeth than fixed spline 113. Because output spline 115 has a different number of teeth than fixed spline 113, as flex spline 109 rotates within output spline 115 and the engaged external teeth 111' precess about the teeth of output spline 115, output spline 115 is rotated relative to fixed spline 113. The ratio between the speed at which output spline 115 rotates relative to fixed spline 113 and the speed at which input shaft 101 rotates may be determined by the ratio of the difference in number of teeth between output spline 115 and fixed spline 113 and the number of teeth in fixed spline 113. For example, in an embodiment in which fixed spline 113 includes 160 teeth and output spline 115 includes 159, output spline 115 may rotate one tooth, or $1/160^{th}$ of a rotation for each rotation of wave generator 107. Thus, such a harmonic gear drive 100 may have a gear-reduction ration of 160:1 between input shaft 101 and output sub 103. One having ordinary skill in the art with the benefit of this disclosure will understand that output spline 115 and fixed spline 113 may include any suitable number of teeth and may have any tooth differential without deviating from the scope of this disclosure.

In some embodiments, as depicted in FIGS. 1, 2, output sub 103 may be a generally tubular member that mechanically couples to additional equipment (not shown), allowing the additional equipment such as components of a bottom hole assembly to rotate relative to fixed sub 117. In some embodiments, output sub 103 and fixed sub 117 may be adapted to support the rotation of input shaft 101. In some embodiments, one or more bearings 119 may be positioned between input shaft 101 and output sub 103 and/or fixed sub 117.

In some embodiments, fixed sub 117 may be mechanically coupled to fixed spline 113 by, for example and without limitation, one or more fasteners including linking pin 121 as depicted in FIG. 1. In some embodiments, output spline 115 may likewise be mechanically coupled to output sub 103 by one or more fasteners such as linking pin 123.

As understood by one having ordinary skill in the art with the benefit of this disclosure, the difference in number of teeth between fixed spline 113 and output spline 115 may be limited by the need for the teeth to properly mesh with external teeth 111 of flex spline 109. In some embodiments, flex spline 109 may include two sets of external teeth 111, each adapted to mesh with one of the teeth of fixed spline 113 or output spline 115. As understood in the art, external teeth 111 in such an embodiment may, for example and without limitation, include different tooth geometry, spacing, or numbers. In some embodiments in which different sets of external teeth 111 are used with fixed spline 113 and output spline 115, fixed spline 113 and output spline 115 may have the same number of teeth, while each set of external teeth 111 of flex spline 109 includes a different number of external teeth.

Figure 4:
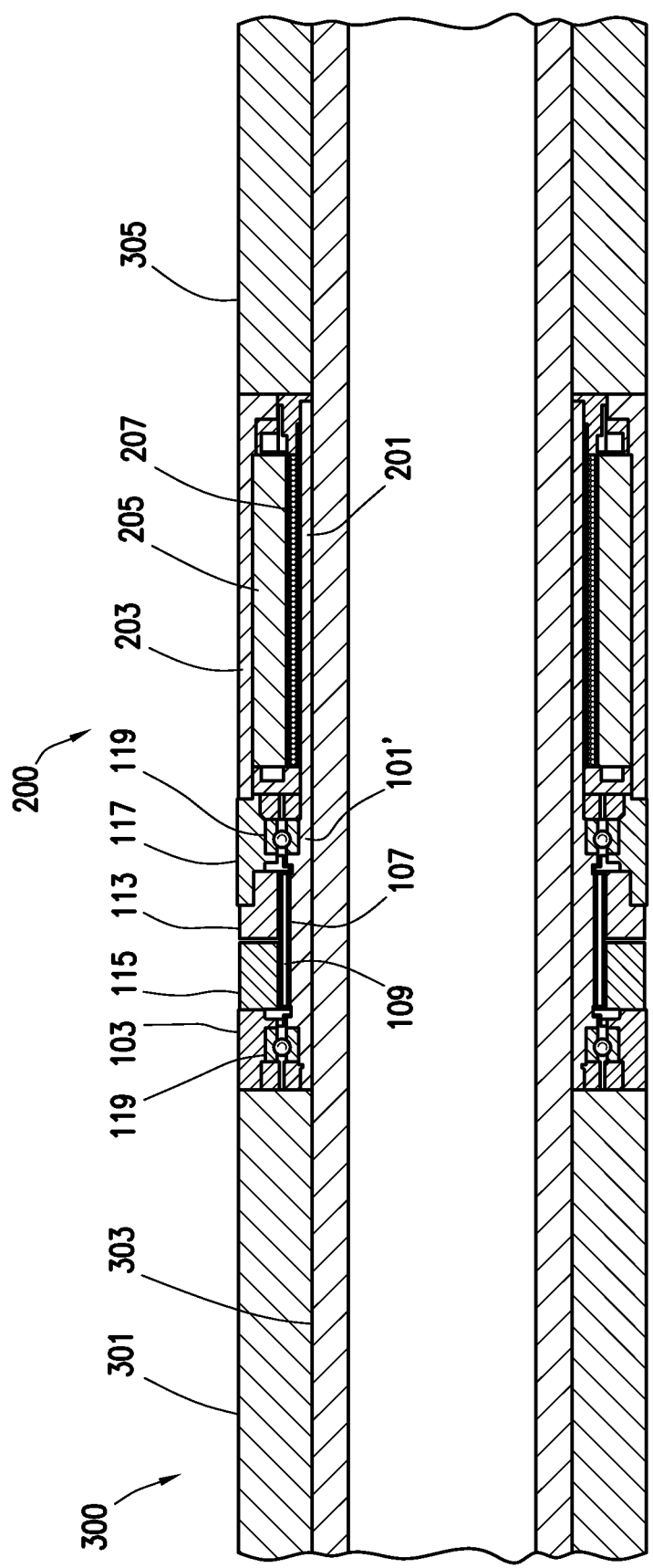
FIG. 4 depicts a cross section view of a harmonic gear drive consistent with at least one embodiment of the present disclosure.

In some embodiments, as depicted in FIG. 4, input shaft 101' may be formed as part of rotor 201 of electric motor 200. Electric motor 200 may include outer housing 203 mechanically coupled to fixed sub 117. Electric motor 200 may include stator 205. Stator 205, as understood in the art, may include windings 207 positioned to induce rotating electromagnetic fields into the interior of stator 205. In some embodiments, electric motor 200 may be an induction motor. In such an embodiment, rotor 201 may include a plurality of windings adapted to cause rotation of rotor 201 in response to the rotating electromagnetic field induced by windings 207. In some embodiments, electric motor 200 may be a permanent magnet motor. In such an embodiment, rotor 201 may include a plurality of permanent magnets positioned to cause rotation of rotor 201 in response to the rotating electromagnetic field induced by windings 207.

In some embodiments, by forming input shaft 101' as a part of rotor 201, backlash may be reduced or eliminated. In some embodiments, bearings 119 may be sufficient to support and/or stabilize the entire length of rotor 201, allowing electric motor 200 to operate without additional bearings. Additionally, the overall length of harmonic gear drive 100 may be reduced.

In some embodiments, input shaft 101 and wave generator 107 may be formed as an integral unit. In some embodiments, input shaft 101 may have a wall thickness of between 3 mm and 20 mm at its narrowest point and between 5 mm and 50 mm at its widest, corresponding with the major diameter $D_M$ of wave generator 107.

In some embodiments, harmonic gear drive 100 may be used in rotary steerable system (RSS) 300, depicted schematically in FIG. 4. RSS 300 may include RSS housing 301 and other components as understood in the art. RSS housing 301 may be mechanically coupled to output sub 103 and may be rotated relative to the rest of drill string 305. In some embodiments, driveshaft 303 may be passed through the interior of input shaft 101. In such an embodiment, the diameter of driveshaft 303 able to be used with harmonic gear drive 100 may depend on the interior diameter of input shaft 101. In some embodiments, by forming input shaft 101 as a generally thin-walled member, the diameter of driveshaft 303 may be maximized for a given outer diameter of harmonic gear drive 100.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:

1. A method for rotating a component of a drill string relative to other components of the drill string in an underground bore, the drill string including a driveshaft, comprising the steps of:
    a) providing a rotary steerable motor system (RSS) that includes an RSS housing rotatable relative to the drill string, a motor comprising a stator and a rotor, and a harmonic gear drive, the harmonic gear drive comprising:
        an input shaft mechanically coupled to the rotor, the driveshaft passing through the input shaft;
        a wave generator mechanically coupled to the input shaft, the wave generator having a diameter that varies and includes a largest diameter, the portion of the wave generator having the largest diameter defining a major diameter of the wave generator;
        a flex spline, the flex spline being tubular and including external teeth, the flex spline positioned about the wave generator;
        a fixed spline, the fixed spline including a first number of internal teeth, the internal teeth of the fixed spline engaging the external teeth of the flex spline that are aligned with the major diameter of the wave generator; and
        an output spline, the output spline including a second number of internal teeth, the internal teeth of the output spline engaging the external teeth of the flex spline that are aligned with the major diameter of the wave generator, the second number of internal teeth being different from the first number of internal teeth, the output spline being mechanically coupled to the RSS housing; and
        the flex spline being elastically deformed by the wave generator such that at least one tooth of the flex spline engages the internal teeth of the fixed spline and the output spline; and
    b) rotating the input shaft so as to rotate the wave generator within the flex spline such that engagement of the flex spline with the internal teeth of the fixed spline and the internal teeth of the output spline causes the output spline to rotate relative to the fixed spline; whereby the RSS housing rotates relative to the drill string at a rate determined by the ratio of the first number of internal teeth to the second number of internal teeth.

2. The method of claim 1, wherein step b) comprises rotating the input shaft with the motor.

3. The method of claim 1, wherein the input shaft is coupled to an output shaft of the motor by a transmission coupling that comprises a castellation formed on the input shaft, wherein the castellation is positioned to interlock with the output shaft, and the method further comprises interlocking the input shaft to the output shaft.

4. The method of claim 1, wherein the input shaft, wave generator, flex spline, fixed spline, and output spline are tubular and have a central bore formed therethrough.

5. The method of claim 1, wherein the wave generator is generally elliptical in cross section.

6. The method of claim 1, wherein the harmonic gear drive further comprises a needle bearing between the wave generator and the flex spline; whereby friction between the wave generator and the flex spline is reduced.

7. The method of claim 1, wherein the harmonic gear drive further comprises an output sub that mechanically couples the output spline to the RSS housing.

8. The method of claim 1, wherein the motor is a mud motor or electric motor.

9. The method of claim 1, wherein the input shaft is formed as part of the rotor.

10. The method of claim 1, wherein the motor includes a motor housing and wherein the harmonic gear drive further comprises a fixed sub that mechanically couples the fixed spline to the motor housing.

11. The method of claim 1, wherein a difference between the first number of teeth and the second number of teeth is between 1 and 10.

12. The method of claim 1, wherein the wave generator is an eccentric cam.

* * * * *